(12) United States Patent
Bright

(10) Patent No.: US 11,557,405 B2
(45) Date of Patent: Jan. 17, 2023

(54) NUCLEAR FUEL STORAGE CASK

(71) Applicant: Jonathan Bright, Lawrenceville, GA (US)

(72) Inventor: Jonathan Bright, Lawrenceville, GA (US)

( * ) Notice: Subject to any disclaimer, the term of this patent is extended or adjusted under 35 U.S.C. 154(b) by 137 days.

(21) Appl. No.: 16/946,905

(22) Filed: Jul. 10, 2020

(65) Prior Publication Data

US 2020/0343011 A1 Oct. 29, 2020

Related U.S. Application Data

(62) Division of application No. 15/671,269, filed on Aug. 8, 2017, now Pat. No. 10,770,194.

(60) Provisional application No. 62/372,976, filed on Aug. 10, 2016.

(51) Int. Cl.
*G21F 5/10* (2006.01)
*G21F 5/12* (2006.01)
*G21F 5/008* (2006.01)

(52) U.S. Cl.
CPC ............. *G21F 5/10* (2013.01); *G21F 5/008* (2013.01); *G21F 5/12* (2013.01)

(58) Field of Classification Search
CPC ... G21F 5/10; G21F 5/12; G21F 5/008; G21F 5/005
See application file for complete search history.

(56) References Cited

U.S. PATENT DOCUMENTS

| | | | |
|---|---|---|---|
| 3,113,215 A | 12/1963 | Allen | |
| 4,021,676 A * | 5/1977 | Duffy | G21F 5/005 |
| | | | 422/903 |
| 4,040,480 A | 8/1977 | Richards | |
| 4,326,918 A | 4/1982 | Lapides | |
| 2003/0138070 A1 | 7/2003 | Georgii | |
| 2014/0270042 A1 | 9/2014 | Dederer | |
| 2016/0027536 A1 | 1/2016 | McClure et al. | |
| 2016/0196887 A1 | 7/2016 | Singh et al. | |

OTHER PUBLICATIONS

Childress, Paul, et al., "Constar—A Family of Concrete Spent Fuel Dry Storage Casks", Waste Management Symposia, 1989, pp. 463-466, retrieved from <http://www.wmsym.org/archives/1989N1/75.pdf>.

(Continued)

*Primary Examiner* — Sharon M Davis
(74) *Attorney, Agent, or Firm* — Alston & Bird LLP

(57) ABSTRACT

A nuclear fuel storage cask includes an outer shell having a length extending from a first end to a second end of the outer shell, the outer shell defining an inner cavity circumscribed by the outer shell, an outer perimeter extending around the outer shell, an inner perimeter positioned inward from the outer perimeter, and a cooling circuit extending along the length of the outer shell, the cooling circuit including an inner passage, and an outer passage, a coolant positioned within the cooling circuit, where the coolant is configured to move through the inner passage, absorbing heat from the inner cavity of the outer shell, and the coolant is configured to move through the outer passage, dissipating heat through the outer perimeter of the outer shell, and a lid coupled the outer shell, where the lid covers the inner cavity of the outer shell.

8 Claims, 18 Drawing Sheets

(56) References Cited

OTHER PUBLICATIONS

Figure 1:
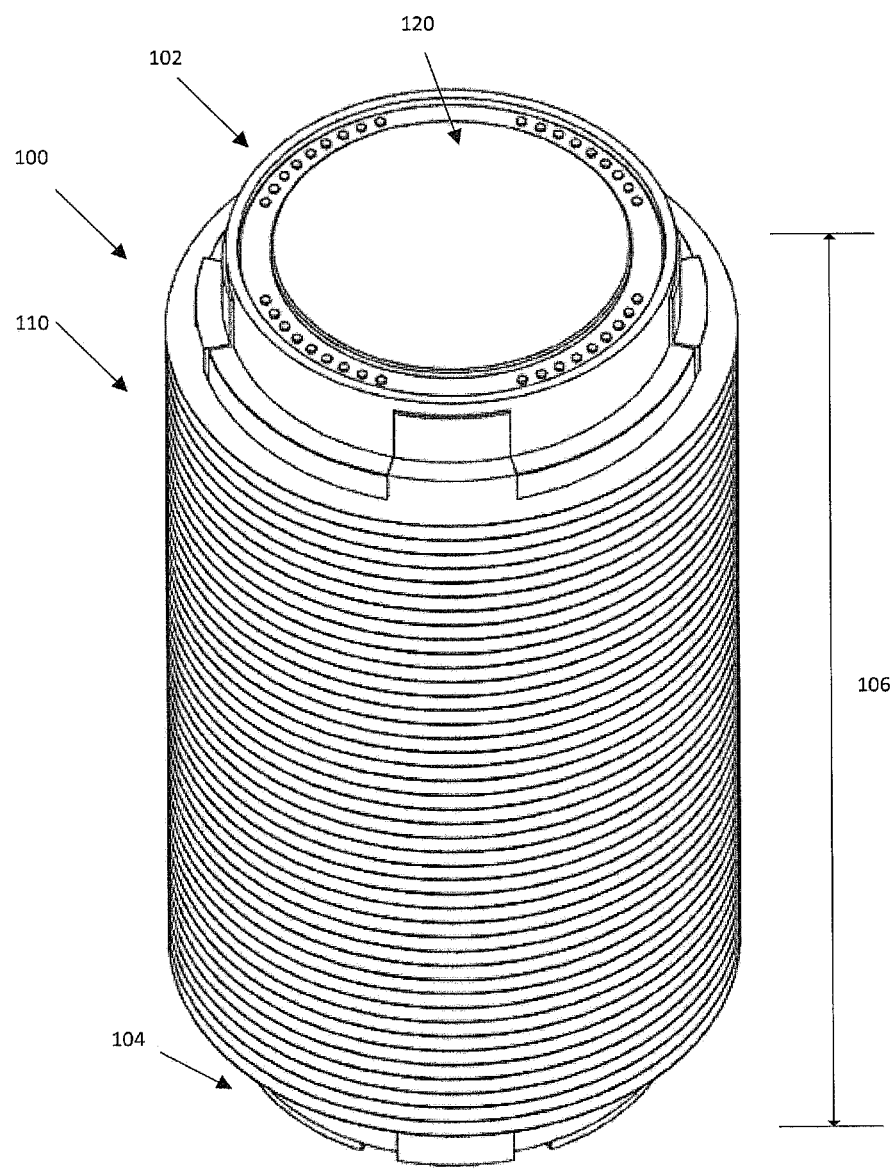

Forsberg, Charles W., "A Multifunction Cask for At-Reactor Storage of Short-Cooled Spent Fuel, Transport, and Disposal", Proceedings of ICAPP 2004, Jun. 13-17, 2004, 11 pages, Pittsburgh, PA, USA.
U.S. Appl. No. 15/671,269, filed Aug. 8, 2017, US-2018/0047471, Allowed.

* cited by examiner

NUCLEAR FUEL STORAGE CASK

CROSS-REFERENCE TO RELATED APPLICATIONS

This application is a divisional of, and claims the benefit of priority to, U.S. application Ser. No. 15/671,269 filed on Aug. 8, 2017, which claims priority to U.S. Provisional Patent Application Ser. No. 62/372,976 filed on Aug. 10, 2016, which are each incorporated herein by reference in their entireties.

BACKGROUND

Nuclear fuel rods are used to generate electrical power, and provide an attractive alternative to the generation of electrical power from fossil fuels. Nuclear fuel rods can be utilized to create a nuclear reaction that may be used to heat water, generating steam to drive a turbine. The turbine may be coupled to a generator, thereby producing electrical energy. Over time, the nuclear fuel rods may become "spent," and may no longer be useful to sustain a nuclear reaction. While no longer able to sustain a useful nuclear reaction, the nuclear fuel rods may continue to produce heat that must be dissipated and may emit radiation that must be contained.

Conventionally, these spent nuclear fuel rods may be kept within a storage pool for a period of time while residual heat from the spent nuclear fuel rods is dissipated. This is sometimes referred to as "wet storage" of the spent nuclear fuel rods. The storage pools are typically located within a nuclear facility, and space within the storage pools may be limited. Once the spent nuclear fuel rods have sufficiently cooled, the spent nuclear fuel rods may be removed from the storage pool and placed within a fuel storage cask for "dry storage."

Conventional fuel storage casks may include cooling vents that allow ambient air to draw heat away from the fuel storage cask via convection, which assists in maintaining the fuel storage cask at an operable temperature. However, these vents may become blocked by foreign objects such as debris, which may restrict the flow of ambient air, thereby reducing the amount of heat drawn away from the fuel storage cask. In some circumstances, blockages of the vents may necessitate that fuel cask and/or the fuel rods within the fuel cask be moved to a storage pool to prevent the fuel rods from overheating and degrading the fuel cask. Accordingly, the vents may require periodic inspection and maintenance to ensure that the fuel storage cask is maintained at an operable temperature, which may increase operating costs.

Accordingly, a need exists for alternative fuel storage casks and cooling systems for fuel storage casks including a self-contained cooling system.

BRIEF SUMMARY

In one embodiment, a fuel storage cask includes an outer shell having a length extending from a first end to a second end of the outer shell, the outer shell defining an inner cavity circumscribed by the outer shell, an outer perimeter extending around the outer shell, an inner perimeter positioned inward from the outer perimeter, and a cooling circuit extending along the length of the outer shell, the cooling circuit including an inner passage, and an outer passage, a coolant positioned within the cooling circuit, where the coolant is configured to move through the inner passage, absorbing heat from the inner cavity of the outer shell, and the coolant is configured to move through the outer passage, dissipating heat through the outer perimeter of the outer shell, and a lid coupled the outer shell, where the lid covers the inner cavity of the outer shell.

In another embodiment, a cooling system for a fuel storage cask includes an inner passage extending around and circumscribing an inner perimeter of a fuel storage cask and extending along a length of the fuel storage cask, the length being evaluated between a first end and a second end of the fuel storage cask positioned opposite the first end, an outer passage positioned outward from the inner passage and in fluid communication with the inner passage, and a coolant positioned within the inner passage and the outer passage, where the coolant is configured to move through the inner passage, absorbing heat from an inner cavity of the storage cask, and the coolant is configured to move through the outer passage, dissipating heat through an outer perimeter of the storage cask.

In yet another embodiment, a method for cooling a fuel storage cask includes providing a cooling circuit including an inner passage extending around and circumscribing an inner perimeter of a fuel storage cask, and an outer passage positioned outward of and in fluid communication with the inner passage, providing a coolant positioned within the inner passage and the outer passage, heating the coolant within the inner passage with a heat source positioned within an inner cavity of the fuel storage cask, moving the coolant within the inner passage upward in a vertical direction, cooling the coolant within the outer passage by dissipating heat to an ambient medium, and moving the coolant within the outer passage downward in the vertical direction.

BRIEF DESCRIPTION OF THE SEVERAL VIEWS OF THE DRAWING(S)

Figure 2:
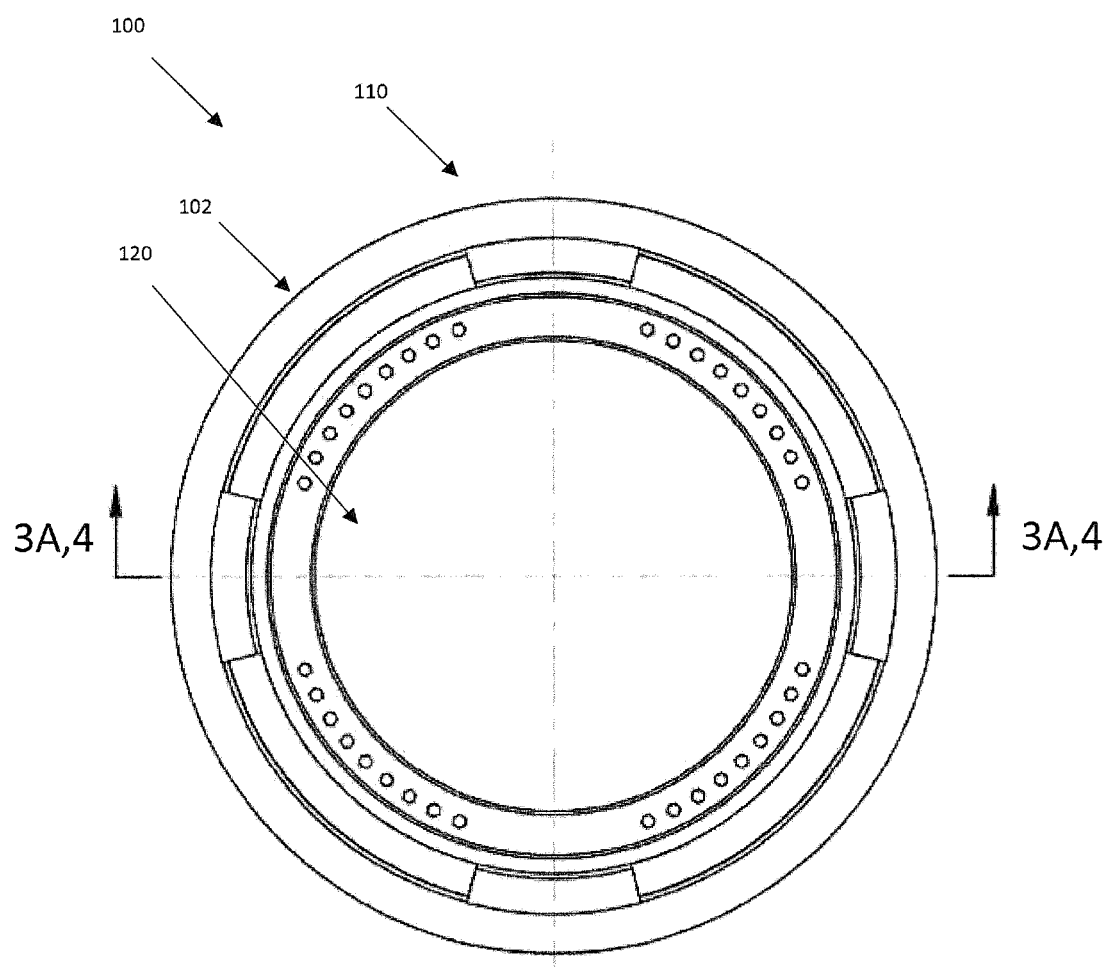
Figure 3A:
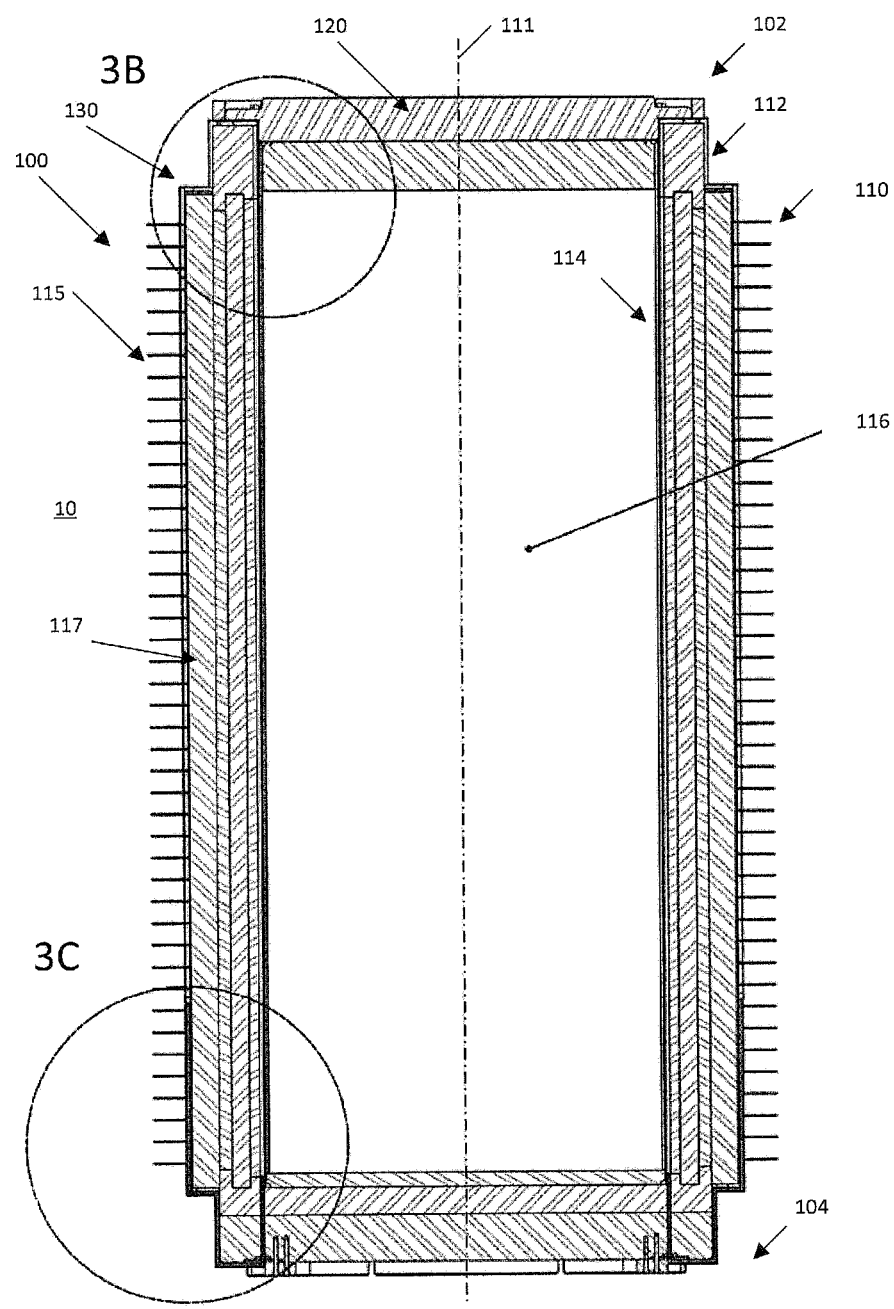
Figure 3B:
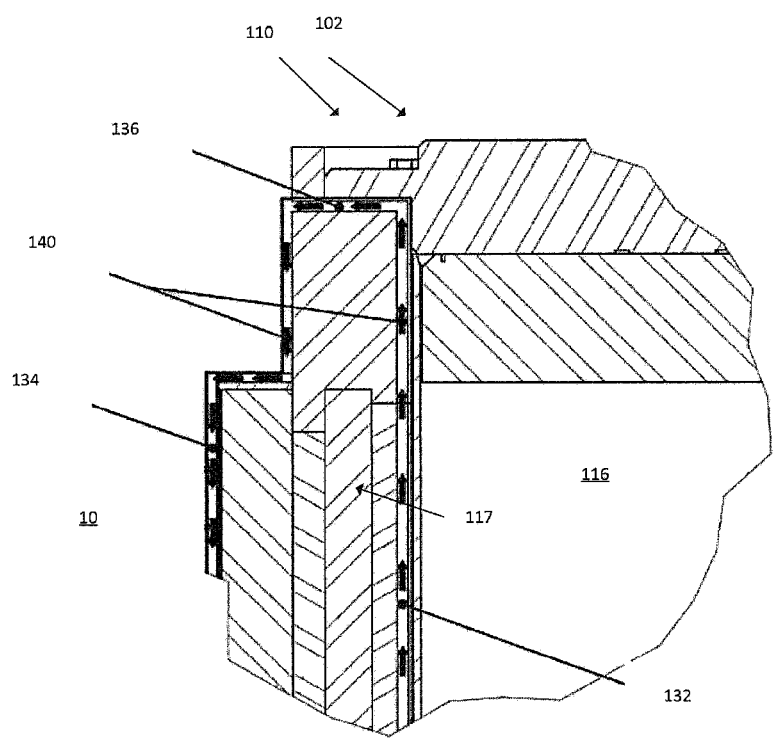
Figure 3C:
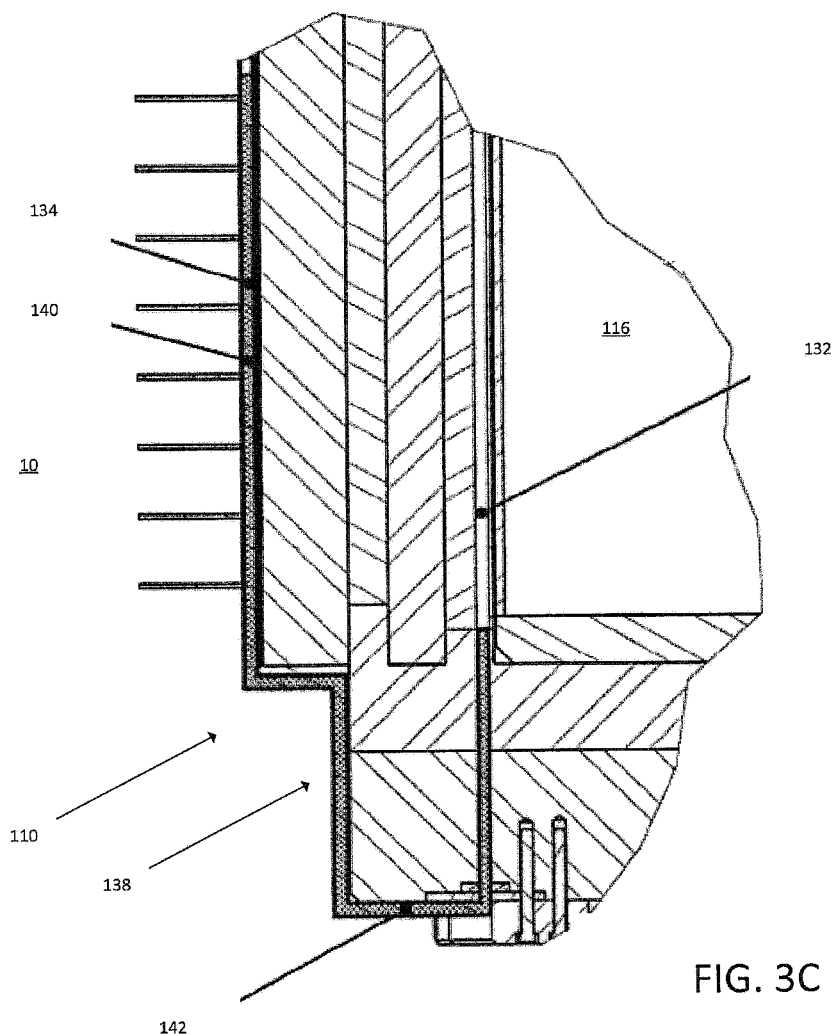
Figure 4:
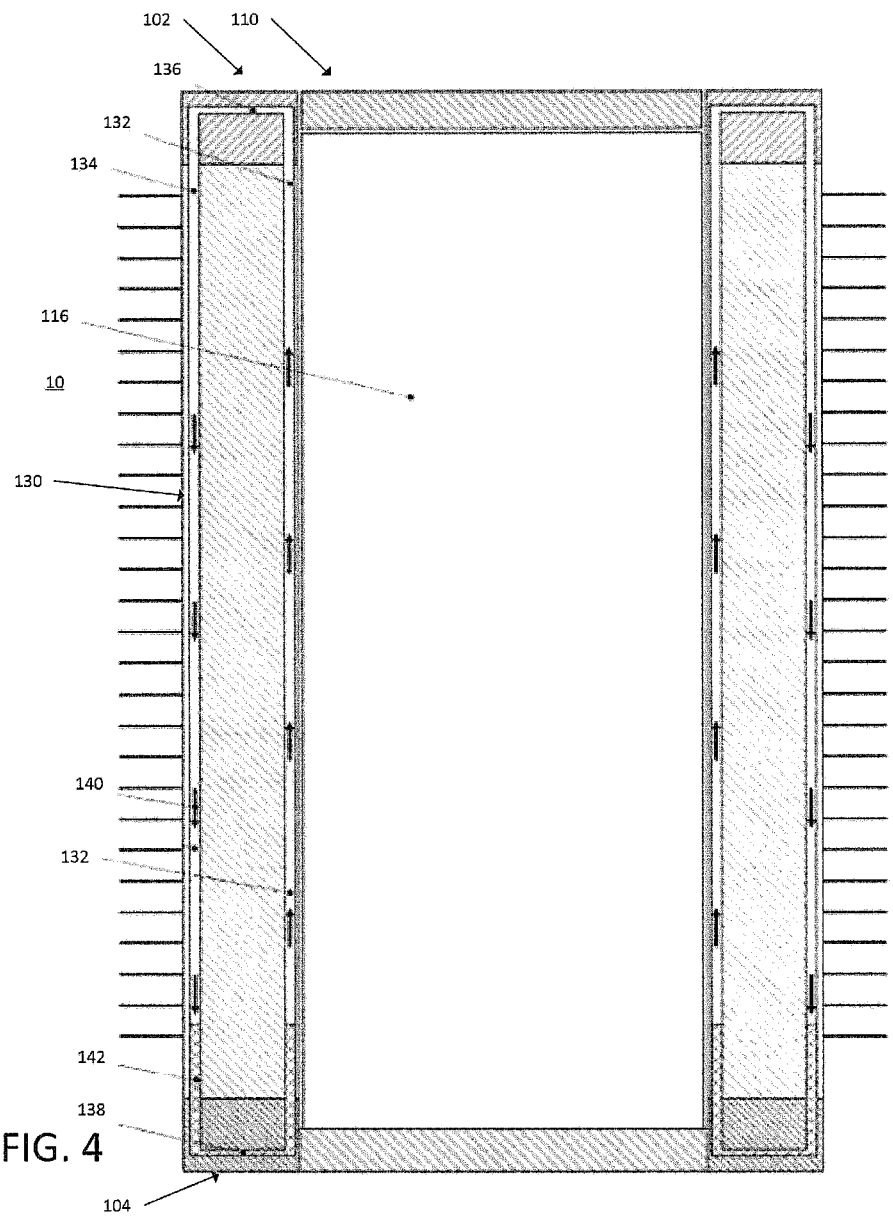
Figure 5:
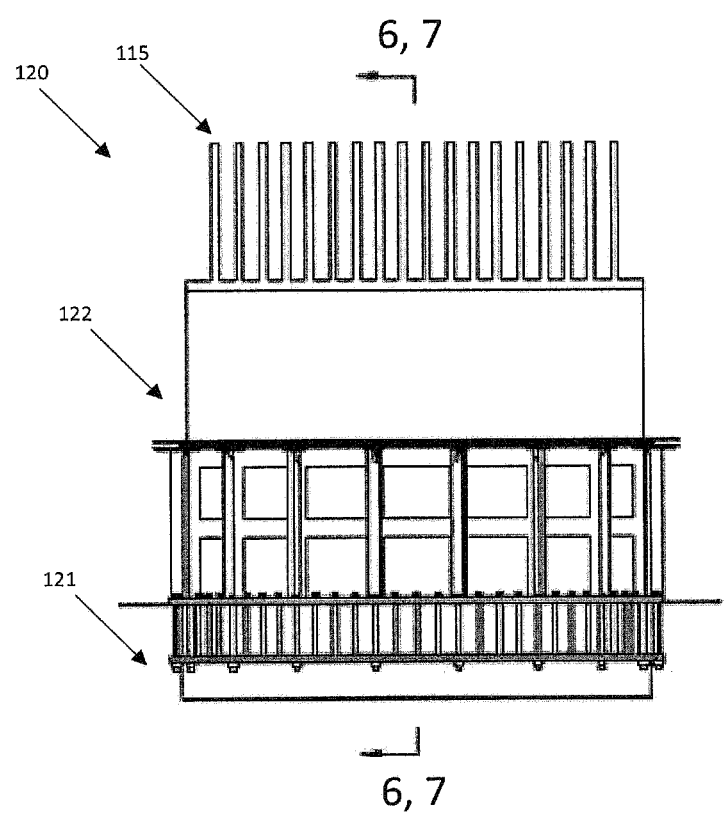
Figure 6:
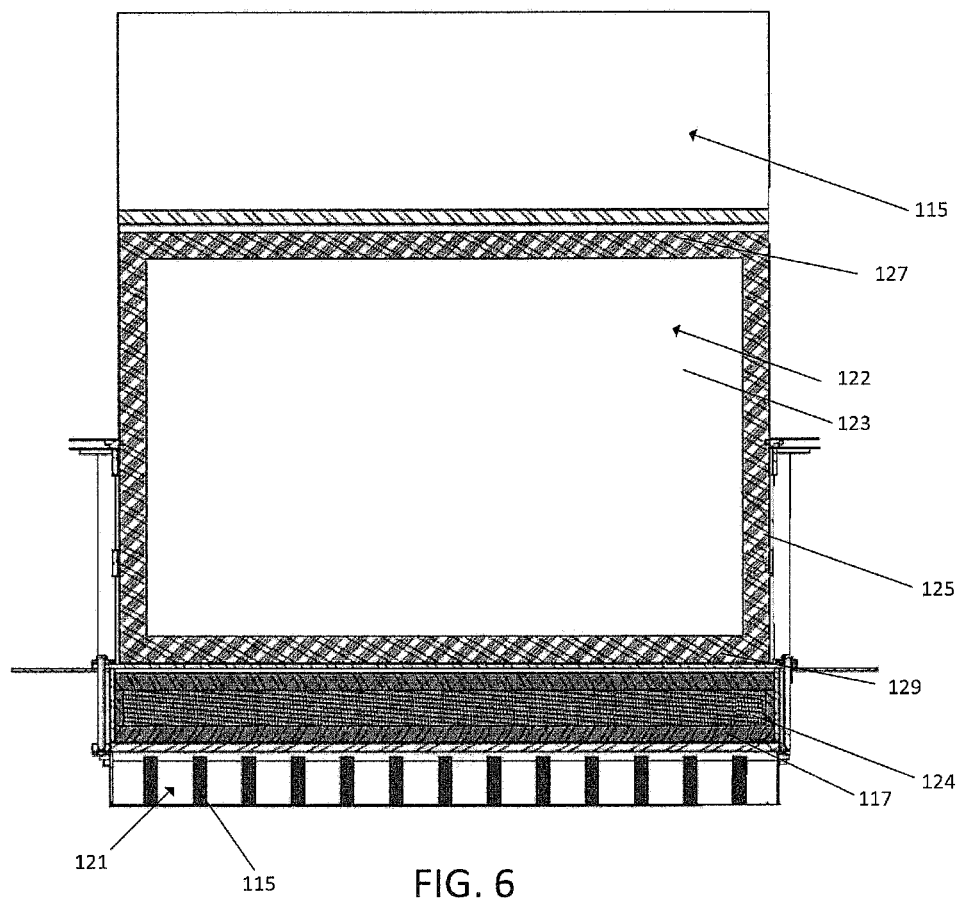
Figure 7:
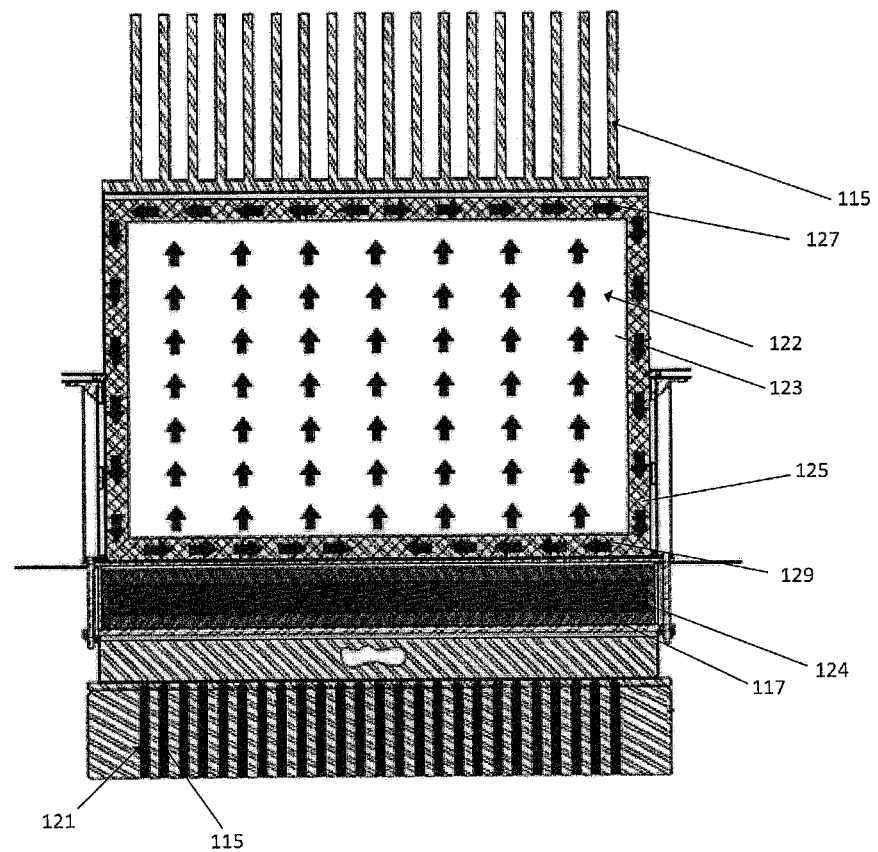
Figure 8:
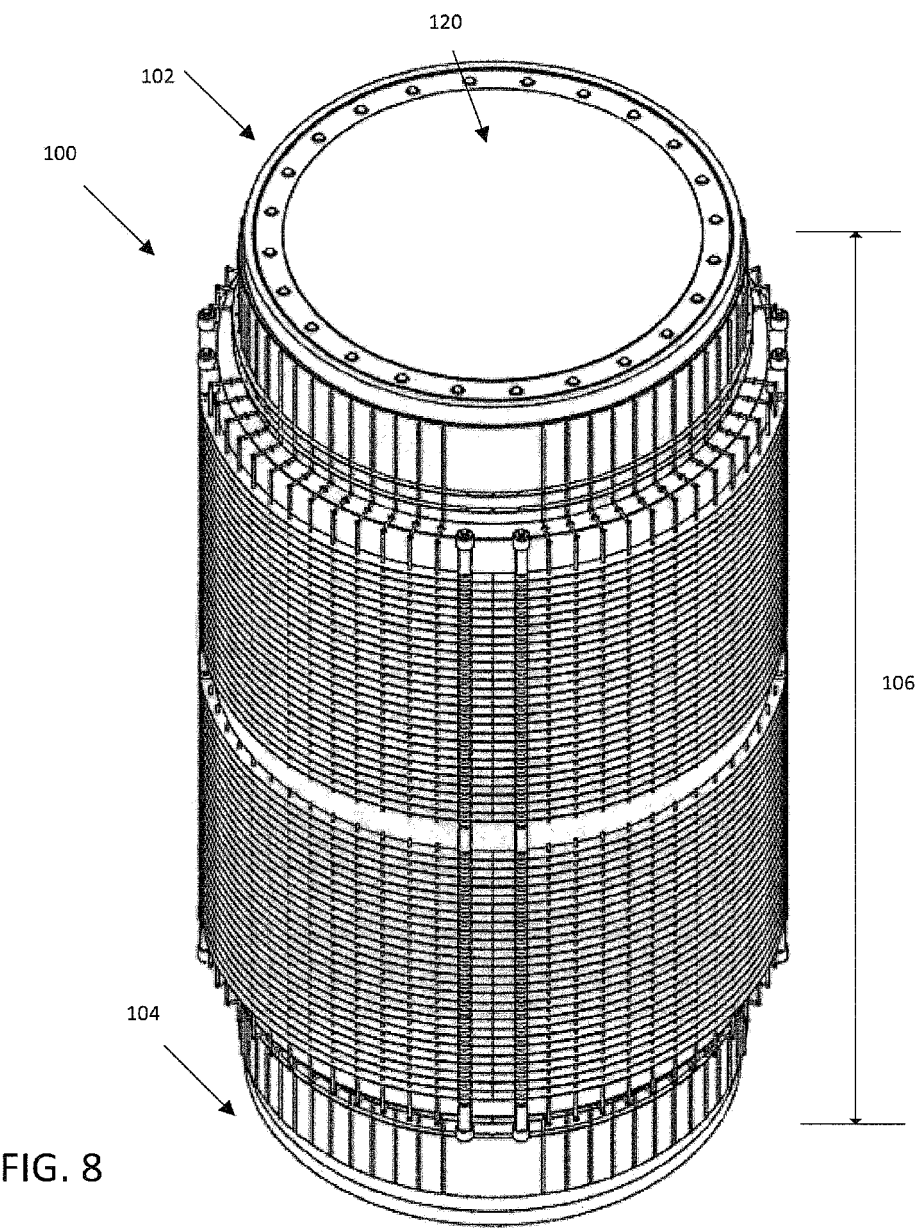
Figure 9:
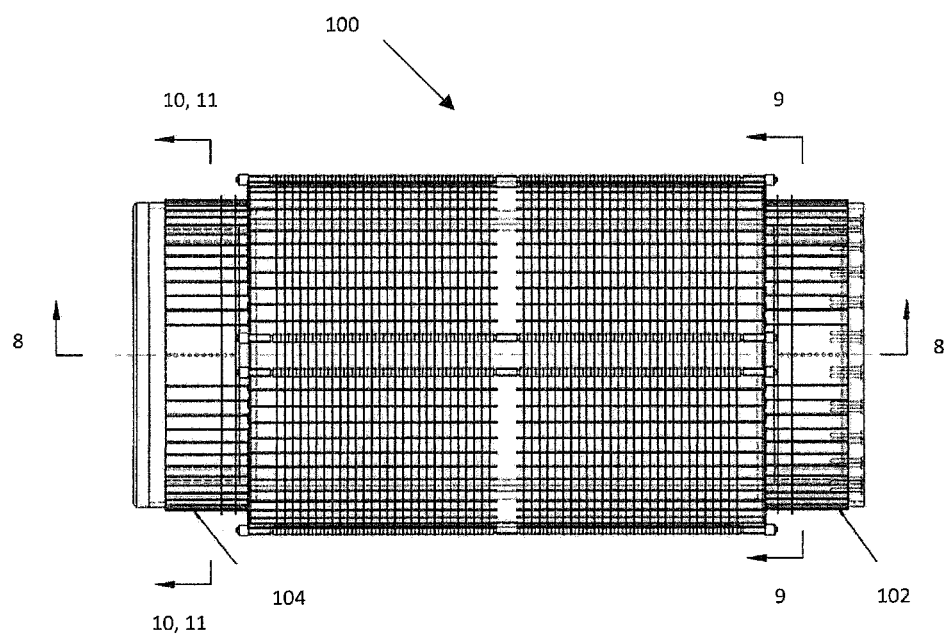
Figure 10:
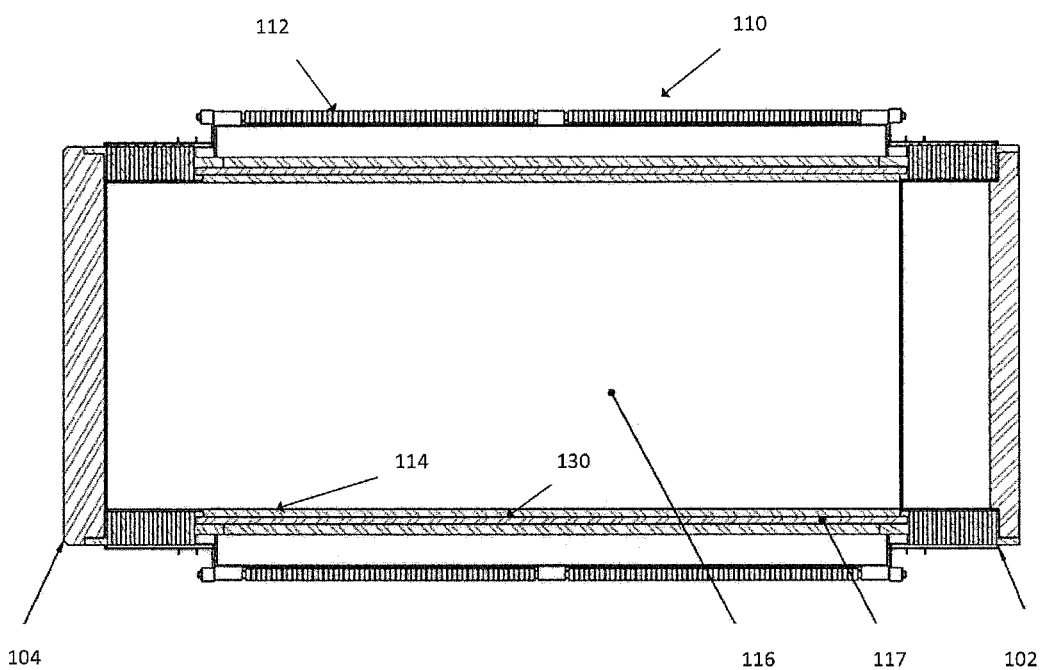
Figure 11:
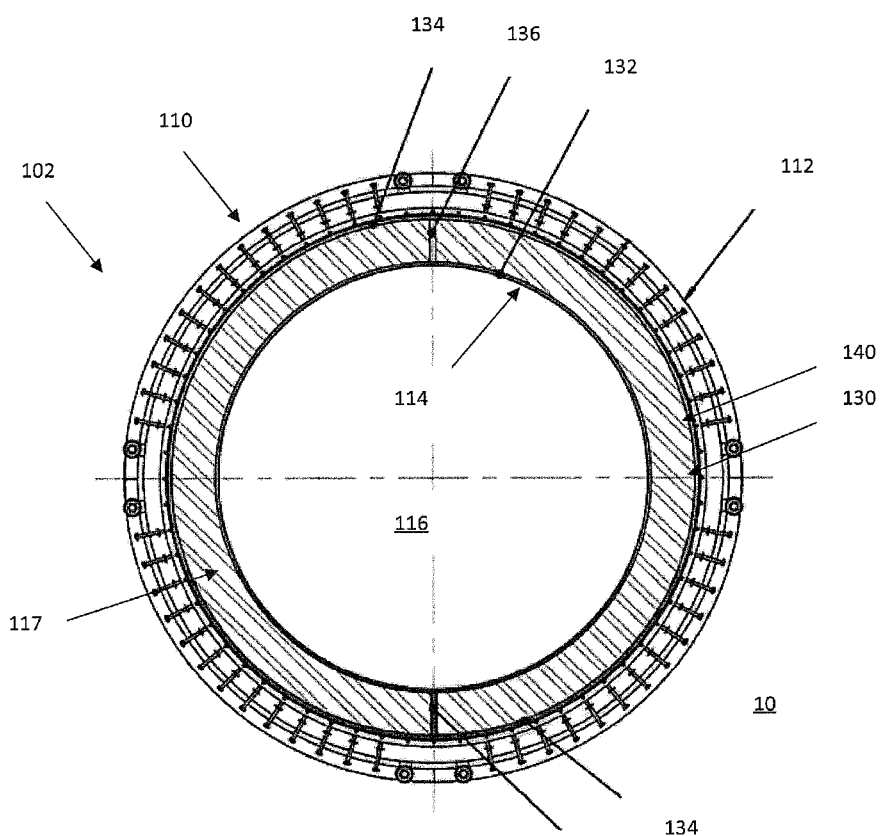
Figure 12:
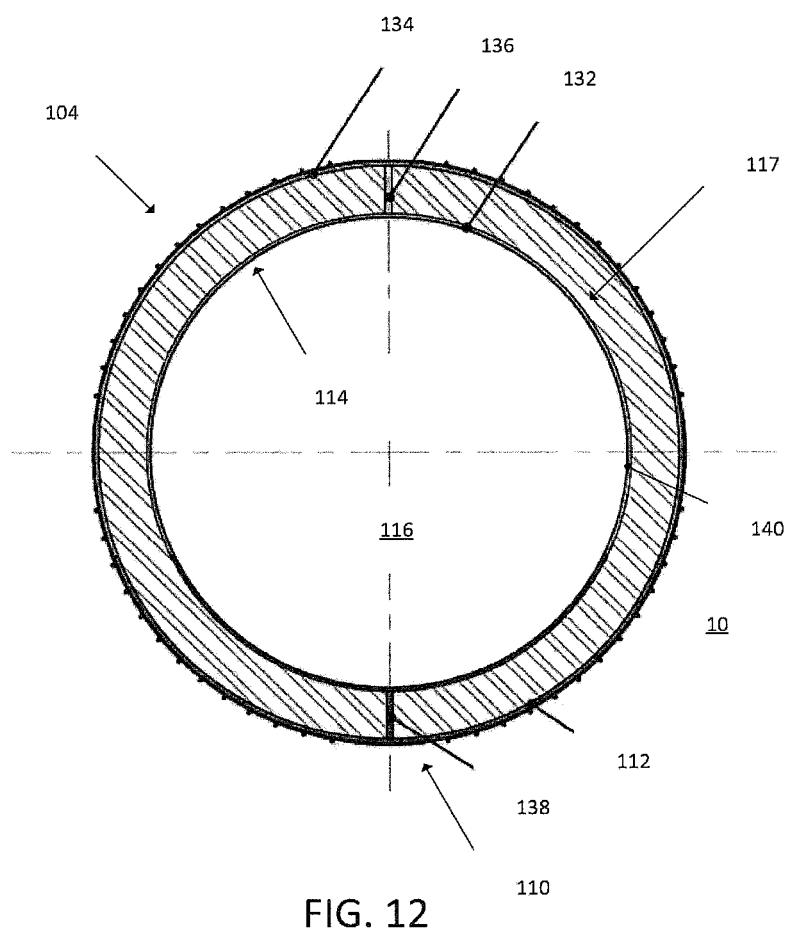
Figure 13:
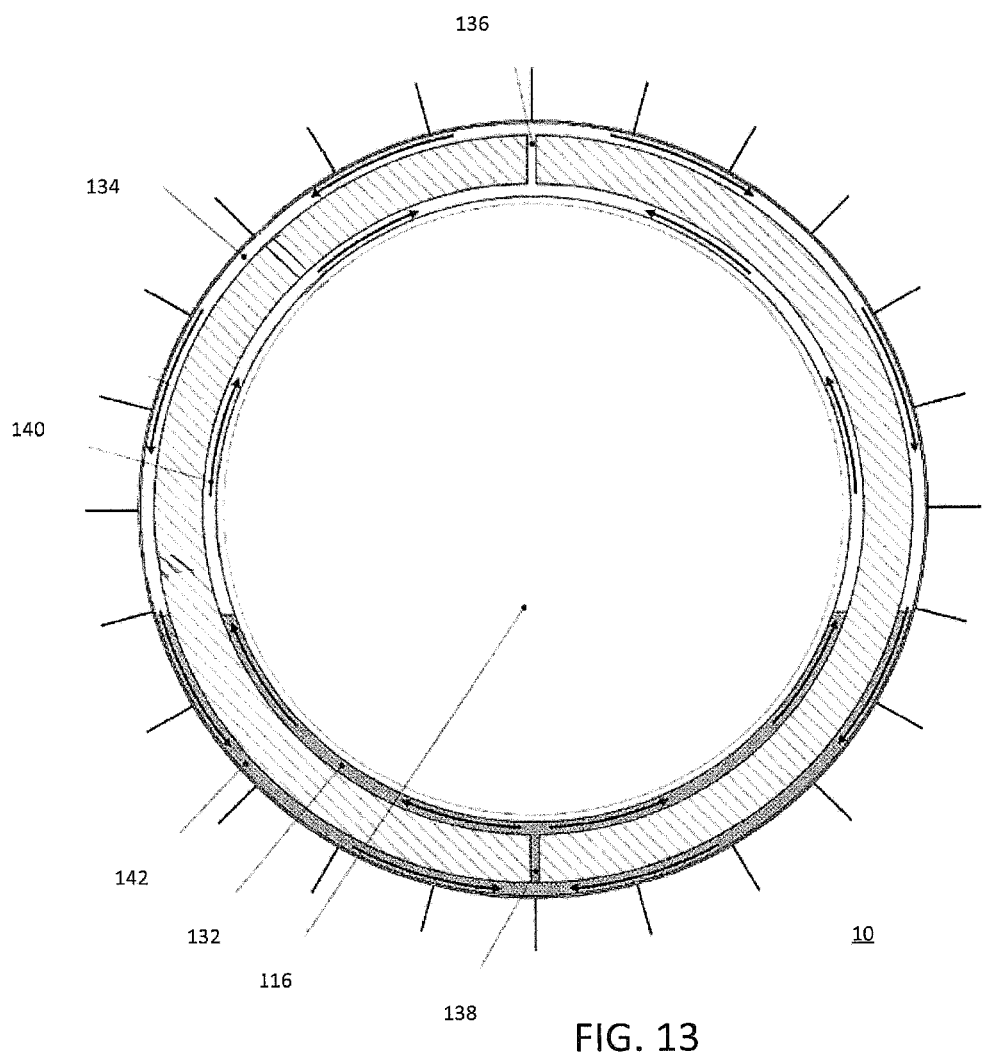
Figure 14:
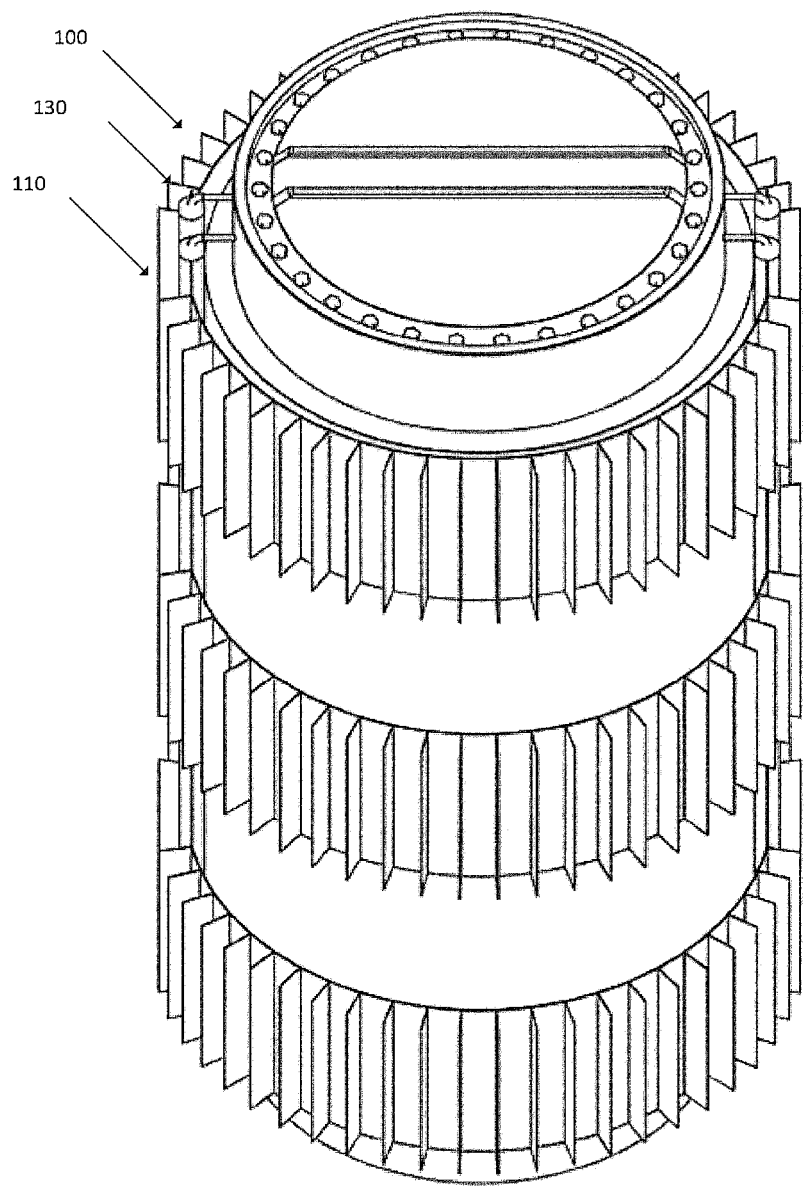
Figure 15:
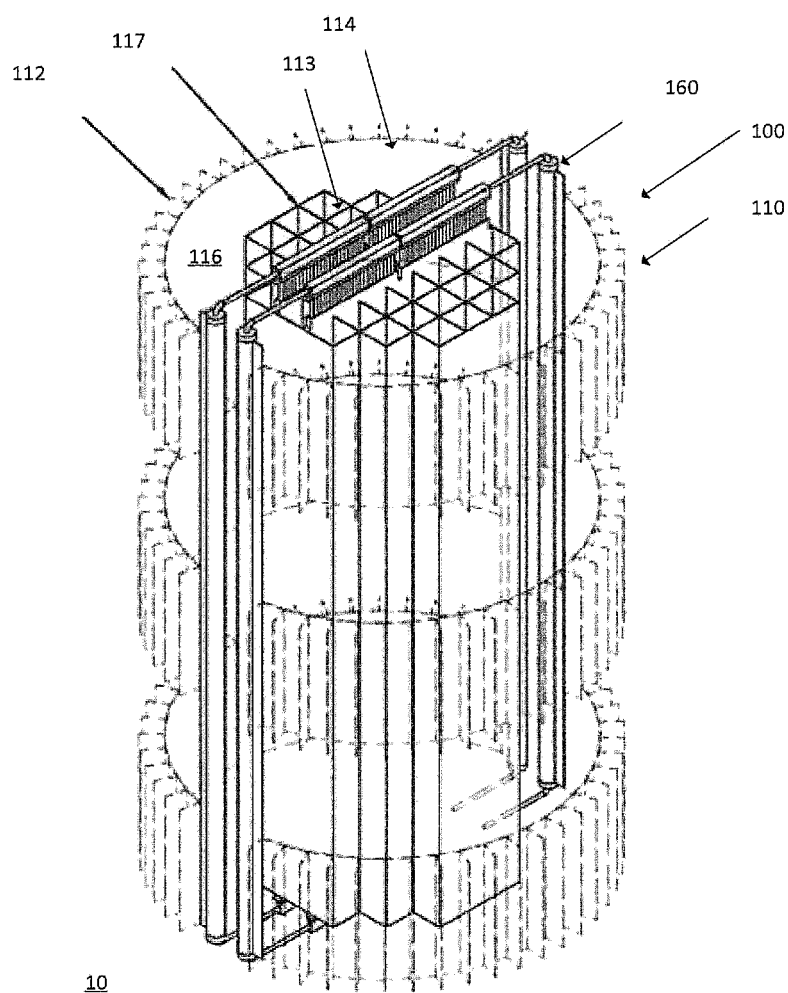
Figure 16:
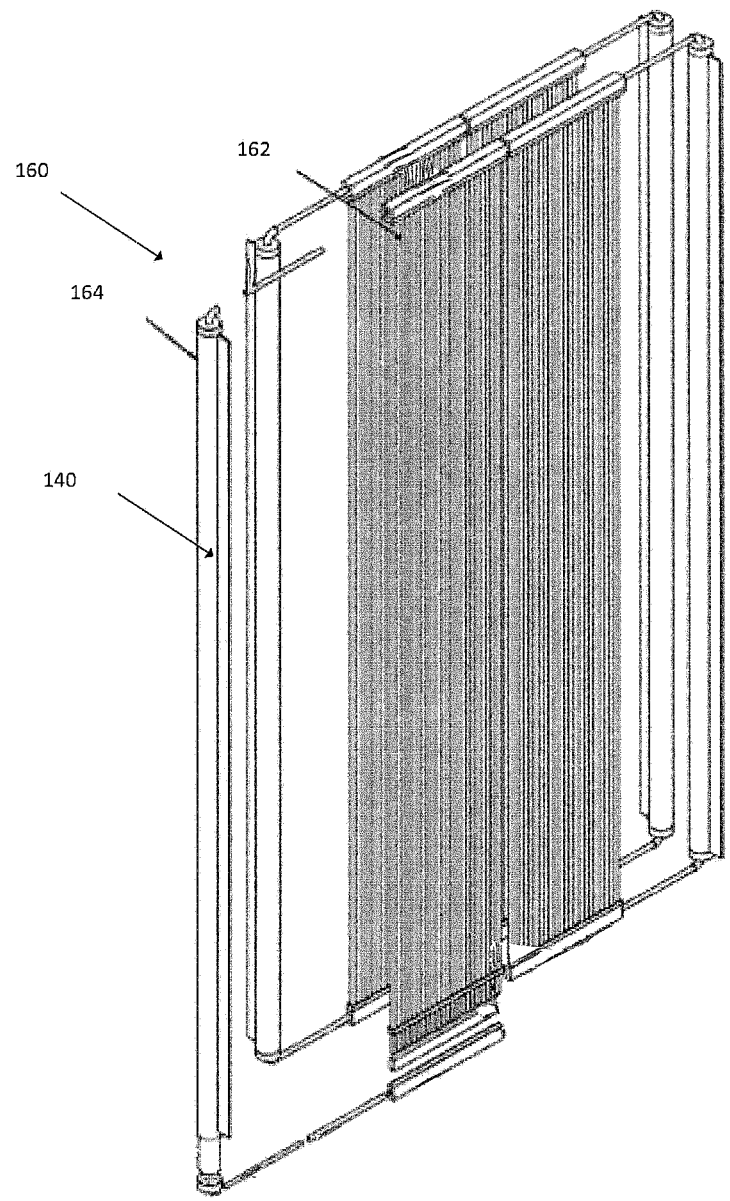

Reference will now be made to the accompanying drawings, which are not necessarily drawn to scale, and wherein:

FIG. 1 schematically depicts a perspective view of a fuel storage cask according to one or more embodiments shown and described herein;

FIG. 2 schematically depicts a top view of the fuel storage cask of FIG. 1 according to one or more embodiments shown and described herein;

FIG. 3A schematically depicts a section view of the fuel storage cask of FIG. 1 along section 3A-3A of FIG. 2 according to one or more embodiments shown and described herein;

FIG. 3B schematically depicts an enlarged view of area 3B of the fuel storage cask of FIG. 3A according to one or more embodiments shown and described herein;

FIG. 3C schematically depicts an enlarged view of area 3C of the fuel storage cask of FIG. 3A according to one or more embodiments shown and described herein;

FIG. 4 schematically depicts a section view of the fuel storage cask of FIG. 1 along section 4-4 of FIG. 2 according to one or more embodiments shown and described herein;

FIG. 5 schematically depicts a front view of a lid of the fuel storage cask of FIG. 2 according to one or more embodiments shown and described herein;

FIG. 6 schematically depicts a section view of the lid of FIG. 5 along section 6-6 of FIG. 5 according to one or more embodiments shown and described herein;

FIG. 7 schematically depicts a section view of the lid of FIG. 5 along section 7-7 of FIG. 5 according to one or more embodiments shown and described herein;

FIG. 8 schematically depicts a perspective view of a fuel storage cask according to one or more embodiments shown and described herein;

FIG. 9 schematically depicts a side view of the fuel storage cask of FIG. 8 according to one or more embodiments shown and described herein;

FIG. 10 schematically depicts a section view of the fuel storage cask of FIG. 9 along section 8-8 of FIG. 9 according to one or more embodiments shown and described herein;

FIG. 11 schematically depicts a section view of the fuel storage cask of FIG. 9 along section 9-9 of FIG. 9 according to one or more embodiments shown and described herein;

FIG. 12 schematically depicts a section view of the fuel storage cask of FIG. 9 along section 10-10 of FIG. 9 according to one or more embodiments shown and described herein;

FIG. 13 schematically depicts a section view of the fuel storage cask of FIG. 9 along section 11-11 of FIG. 9 according to one or more embodiments shown and described herein;

FIG. 14 schematically depicts a perspective view of a fuel storage cask according to one or more embodiments shown and described herein;

FIG. 15 schematically depicts another perspective view of the fuel storage cask of FIG. 14 according to one or more embodiments shown and described herein; and FIG. 16 schematically depicts a perspective view of a central cooling member of the fuel storage cask of FIG. 14 according to one or more embodiments shown and described herein.

DETAILED DESCRIPTION OF VARIOUS EMBODIMENTS

Various embodiments of fuel storage casks now will be described more fully hereinafter with reference to the accompanying drawings, in which some, but not all embodiments of the fuel storage cask are shown. Indeed, these fuel storage casks may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Terms are used herein both in the singular and plural forms interchangeably. Like numbers refer to like elements throughout.

Many modifications and other embodiments of the fuel storage casks set forth herein will come to mind to one skilled in the art having the benefit of the teachings presented in the foregoing descriptions and the associated drawings. Therefore, it is to be understood that the fuel storage casks described herein are not to be limited to the specific embodiments disclosed and that modifications and other embodiments are intended to be included within the scope of the appended claims. Although specific terms are employed herein, they are used in a generic and descriptive sense only and not for purposes of limitation.

As used herein, the term "thermally coupled" means that thermal energy may be exchanged between various components described herein. Thermally coupled components may be in direct or in indirect contact with one another.

Fuel storage casks are used to store spent nuclear fuel, such as spent nuclear fuel rods that may result from electrical power generation from nuclear power. Although the spent nuclear fuel may have been removed from a nuclear reaction, the spent nuclear fuel may continue to generate heat within the fuel storage cask, and it is desirable to dissipate heat from the spent nuclear fuel to maintain the fuel storage cask at an acceptable temperature. Fuel storage casks as described herein include a shell that defines a cooling circuit that assists in dissipating heat from the fuel storage cask.

Referring initially to FIG. 1, a perspective view of a fuel storage cask 100 is schematically depicted. The fuel storage cask 100 includes an outer shell 110 including a first end 102 and a second end 104 positioned opposite the first end 102. The fuel storage cask 100 has a length 106 evaluated between the first end 102 and the second end 104. The length 106 may be selected to such that a spent nuclear fuel rod may be positioned within and encapsulated by the fuel storage cask 100. While in the embodiment depicted in FIG. 1 the fuel storage cask 100 and the outer shell 110 have a generally cylindrical shape, it should be understood that the fuel storage cask 100 and the outer shell 110 may have any suitable shape for storing spent nuclear fuel. As non-limiting examples, the cask and shell may be include a rectangular prism shape, a cubical shape, a conical shape, or a spherical shape. The outer shell 110 may be formed from any suitable construction materials or combination of materials, including but not limited to, concrete, cement, cermet, metal, composites, or the like.

Referring to FIG. 2, a top view of the fuel storage cask 100 of FIG. 1 is schematically depicted. The fuel storage cask 100 further includes a lid 120 that is coupled to the first end 102 of the outer shell 110. When installed, the lid 120 covers an opening of the outer shell 110, such that the lid 120 may encapsulate an interior of the outer shell 110. In some embodiments, the lid 120 may cover the only opening that allows access the interior of the outer shell 110. In other embodiments, the fuel storage cask 100 may also include another lid coupled to the second end 104 (FIG. 1) of the outer shell 110, covering a second opening positioned at the second end of the outer shell 110. The lid 120 or lids may be coupled to the outer shell 110 by any suitable methodology, including but not limited to, welding, brazing, mechanical fasteners, structural adhesives, or the like.

Referring to FIG. 3A, a section view of the fuel storage cask 100 along section 3A-3A of FIG. 2 is schematically depicted. The fuel storage cask 100 is in a "vertical" orientation, such that the first end 102 of the fuel storage cask 100 is positioned above the second end 104 of the fuel storage cask 100 in a vertical direction. The outer shell 110 defines an outer perimeter 112 that extends around the outer shell 110. The outer perimeter 112 may optionally include fins 115 that assist in transferring heat from the outer shell 110 to an ambient medium 10 outside of the outer shell 110. In embodiments, the fins 115 may include any suitable geometry and may be oriented in any suitable matter to assist in transferring heat energy from the outer shell 110 to the ambient medium 10. The outer shell 110 further defines an inner perimeter 114 that defines and circumscribes an inner cavity 116. The inner perimeter 114 is positioned between the outer perimeter 112 and the inner cavity 116. In embodiments, the inner perimeter 114 and the outer perimeter 112 include similar and concentric shapes. For example, in the embodiment shown in FIG. 3A, the inner perimeter 114 and the outer perimeter 112 include concentric circular shapes. In other embodiments, the inner perimeter 114 and the outer perimeter may include different and/or non-concentric shapes. For example and without limitation, one of the inner perimeter 114 and the outer perimeter 112 may include a circular shape, while the other of the inner perimeter 114 and the outer perimeter 112 includes a square or rectangular shape. The inner perimeter 114 and the outer perimeter 112 may include any suitable shape to accommodate spent nuclear fuel rods stored within the inner cavity 116 of the outer shell 110.

In embodiments, the outer shell 110 of the fuel storage cask 100 includes a shielding 117 that restricts and/or prevents radiation from spent fuel rods within the inner cavity 116 from passing through the outer shell 110. The shielding 117 may include various materials that restrict and/or prevent radiation, such as may be emitted from spent nuclear fuel rods, from passing through the shielding 117, and may be formed from materials such as lead, iron, concrete, or the like. The shielding 117 may be positioned to encapsulate the inner cavity 116, such that shielding 117 is positioned between the inner cavity 116 and the outer perimeter 112 of the outer shell 110, so as to prevent a "direct path," or route for radiation emitted from within the inner cavity 116 to reach areas outside of the outer shell 110 without first passing through the shielding. In other words, shielding may be positioned throughout the outer shell 110 so as to fully encapsulate the inner cavity 116.

In the embodiment depicted in FIG. 3A, the outer shell 110 of the fuel storage cask 100 includes a central axis 111 extending through the outer shell 110, and the outer shell 110 includes a generally cylindrical shape that is symmetrical about the central axis 111. In other embodiments, the outer shell may be asymmetrical about the central axis 111. The fuel storage cask 100 includes a cooling circuit 130 that is positioned between the inner perimeter 114 and the outer perimeter 112 of the outer shell 110, and that extends circumferentially around at least the inner perimeter 114 of the outer shell 110. In the embodiment shown in FIG. 3A, the cooling circuit 130 is generally symmetrical about the central axis 111. The cooling circuit 130 assists in dissipating heat generated by spent fuel rods positioned within the fuel storage cask 100.

Referring to FIG. 3B, an enlarged view of the region 3B shown in FIG. 3A is schematically depicted. The cooling circuit 130 includes an inner passage 132 and an outer passage 134 that is positioned outward from the inner passage 132. In embodiments where the outer shell 110 includes a cylindrical shape, the outer passage 134 is positioned radially outward from the inner passage 132. While only a portion of the inner passage 132 and the outer passage 134 is shown, it should be understood that in the embodiment shown in FIG. 3B, the inner passage 132 and the outer passage 134 extend circumferentially around the inner cavity 116. In embodiments, the shielding 117 is positioned between the inner passage 132 and the outer passage 134 and is positioned so as to prevent a "direct path," or route for radiation emitted from within the inner cavity 116 to reach areas outside of the outer shell 110 without first passing through the shielding. Alternatively, the shielding 117 may be positioned outward of the outer passage 134 and/or inward of the inner passage 132 to prevent radiation emitted from within the inner cavity 116 from reaching areas outside of the outer shell 110.

The inner passage 132 and the outer passage 134 each include a generally annular shape that is symmetrical about the central axis 111 (FIG. 3A) of the outer shell 110. Alternatively, the inner passage 132 and the outer passage 134 may include shapes that are asymmetrical about the central axis 111 (FIG. 3A). The cooling circuit 130 includes an exit passage 136 that connects and is in fluid communication with the inner passage 132 and the outer passage 134. In the embodiment depicted in FIG. 3B, the exit passage 136 is positioned at the first end 102 of the outer shell 110 and includes an annular shape that extends circumferentially around the outer shell 110.

A coolant 140 is provided within the inner passage 132 and the outer passage 134, and the coolant 140 assists in dissipating heat generated by a heat source such as spent fuel rods positioned within the inner cavity 116 of the outer shell 110. The cooling circuit 130 may be hermetically sealed, such that the coolant 140 is contained within the cooling circuit 130. The inner passage 132 of the cooling circuit 130 is thermally coupled to the inner cavity 116 such that heat generated by spent fuel rods within the inner cavity 116 may be transferred to the inner passage 132, and more particularly to the coolant 140 within the inner passage 132. In the embodiment shown in FIG. 3B, the coolant 140 flows upward through the inner passage 132, where it absorbs heat energy from the inner cavity 116. The upward flow of the coolant 140 may be induced by convective flow of the coolant 140 resulting from the absorbed energy from the inner cavity 116. For example, as the coolant 140 absorbs heat energy from the inner cavity 116, a temperature of the coolant 140 may increase and a density of the coolant 140 may decrease, causing the coolant 140 to rise as a result of natural convection. Alternatively or additionally, the flow of the coolant 140 through the inner passage 132 may be induced, such as with a pump, and the pump may induce flow of the coolant 140 upward or downward in the vertical direction within the inner passage 132. Upon reaching the top of the inner passage 132, the coolant 140 flows radially outward through the exit passage 136 toward the outer passage 134.

The coolant 140 then flows downward through the outer passage 134, dissipating heat to an ambient medium 10 surrounding the outer shell 110. The ambient medium 10 may include gas, liquid, and/or a solid surrounding the outer shell, such as ambient air. The downward flow of the coolant 140 through the outer passage 134 may similarly be induced by convective flow of the coolant 140 as energy from the coolant 140 is transferred to the ambient medium 10. In particular, the coolant 140 within the outer passage 134 is positioned distal from the inner cavity 116 as compared to the coolant 140 within the inner passage 132, reducing the amount of heat absorbed by the coolant 140 within the outer passage 134 as compared to the inner passage 132. Further, the outer passage 134 is thermally coupled to the ambient medium 10 surrounding the outer shell 110, such that heat from the coolant 140 within the outer passage 134 is transferred to the ambient medium 10. As the coolant 140 transfers heat energy to the ambient medium 10, the temperature of the coolant 140 may decrease and the density of the coolant 140 may increase, causing the coolant 140 to move downward as a result of natural convection.

Referring to FIG. 3C an enlarged view of the region 3C shown in FIG. 3A is schematically depicted. At the second end 104 of the outer shell 110, the outer passage 134 is in fluid communication with the inner passage 132 through a return passage 138. While only a portion of the return passage 138 is shown in FIG. 3C, it should be understood that the return passage 138 includes an annular shape that extends circumferentially around the outer shell 110. As the coolant 140 flows downward through the outer passage 134, the coolant 140 continues to dissipate heat to the ambient medium 10, thereby lowering the temperature of the coolant 140. Alternatively or additionally, the flow of the coolant 140 through the outer passage 134 may be induced, such as with a pump, and the pump may induce flow of the coolant 140 upward or downward in the vertical direction within the outer passage 134. When the coolant 140 reaches the second end 104, the coolant 140 flows radially inward through the return passage 138 toward the inner passage 132. In some embodiments, the return passage 138 may include an optional wick 142 that assists in moving coolant 140 from the outer passage 134 toward the inner passage 132, such as through capillary action. However, in other embodiments, convective flow of the coolant 140 alone induces movement of the coolant 140 radially inward through the return passage 138. Upon reaching the inner passage 132 through the return passage 138, the coolant 140 begins to flow upward again through the inner passage 132, again absorbing heat from the inner cavity 116.

Referring to FIG. 4, the overall flow of coolant 140 through the cooling circuit 130 is schematically depicted. As described above, when the outer shell 110 is in a vertical orientation, the coolant 140 flows upward through the inner passageway 132 toward the first end 102, absorbing heat from the inner cavity 116, such as from spent fuel rods positioned within the inner cavity 116. As the coolant 140 flows upward, the coolant 140 reaches the first end 102 of the outer shell 110, and moves outward through the exit passage 136. After passing through the exit passage 136, the coolant 140 flows downward through the outer passage 134, and dissipates heat to the ambient medium 10. After cooling, the coolant 140 reaches the second end 104 and flows inward through the return passage 138 back to the inner passage 132 to again absorb heat from the inner cavity 116. The fuel storage cask 100 optionally includes the wick 142 positioned in the outer passage 134, the return passage 138, and/or the inner passage 132, and may assist in moving coolant 140 through the return passage 138 to the inner passage 132, for example, when the outer shell 110 is not in the vertical orientation. In embodiments, the coolant 140 may include a gas, a liquid, or a gas/liquid mix that absorbs heat from the inner cavity 116. For example, in some embodiments, the coolant 140 includes helium or the like.

As the inner passage 132 and the outer passage 134 include annular shapes that extend circumferentially around the outer shell, the inner passage 132 and the outer passage 134 may assist in dissipating heat from the fuel storage cask 100. For example, as the inner passage 132 includes an annular shape that extends circumferentially around the inner perimeter 114 of the inner cavity 116, the inner passage 132 may fully encapsulate the inner cavity 116. As the inner passage 132 encapsulates the inner cavity 116, the amount of heat that may be transferred from the inner cavity 116 may be increased as the inner passage 132 may have a relatively high amount of surface area exposed to the inner cavity 116 as compared to an inner passage that does not fully encapsulate the inner perimeter 114. Similarly, in embodiments, the outer passage 134 includes an annular shape that extends circumferentially around the outer shell 110, which may increase the amount of heat that may be transferred from coolant 140 within the outer passage 134 to the ambient medium 10 as compared to an outer passage that does not have an annular shape that extends around the outer shell 110.

Referring to FIG. 5, a front view of the lid 120 of the fuel storage cask 100 is schematically depicted. The lid 120 generally a cooling circuit 122, and the lid 120 optionally includes fins 115 positioned on top of the cooling circuit 122 and a heat sink 121 positioned below the cooling circuit 122.

Referring to FIG. 6, a section view of the lid 120 of the fuel storage cask 100 along 6-6 is schematically depicted. In the embodiment depicted in FIG. 6, the lid 120 includes the lid cooling circuit 122 positioned above the heat sink 121. The heat sink 121 may include fins 115 that are configured to thermally couple the outer shell 110 (FIG. 4) to the lid cooling circuit 122, such as through conduction. The lid 120 may further include shielding 117 and a neutron absorber 124 positioned between the heat sink 121 and the cooling circuit 122. The shielding 117 and the neutron absorber 124 may prevent radiation from passing from the interior of the outer shell 110 (FIG. 4) to the cooling circuit 122. In some embodiments, the lid 120 may optionally include heat pipes positioned around a perimeter of the lid 120 to assist with the dissipation of heat.

The lid cooling circuit 122 defines a vapor passage 123 that is in fluid communication with a lid outer passage 125. When installed to the outer shell 110, the vapor passage 123 is thermally coupled to the inner cavity 116 (FIG. 4) of the outer shell 110, while the lid outer passage 125 is thermally coupled to the ambient medium 10, and a coolant 140 is positioned within the vapor passage 123 and the lid outer passage 125. Similar to the cooling circuit 130 of the outer shell 110 (FIG. 4), the lid cooling circuit 122 assists in dissipating heat generated from spent fuel rods stored within the inner cavity 116 of the outer shell 110.

Referring collectively to FIGS. 6 and 7, the section view of the lid and a section view of the lid with arrows showing the direction of flow of coolant 140 are depicted, respectively. The coolant 140 within the vapor passage 123 absorbs heat from the inner cavity 116 (FIG. 4) and flows upward, such as through convective flow. The coolant 140 then flows through a lid exit passage 127 that is positioned above the vapor passage 123. The coolant 140 then flows radially outward through lid exit passage 127 to the lid outer passage 125, and exchanges heat energy with the ambient medium 10. Similar to the upward flow of the coolant 140 through the vapor passage 123, the outward flow of the coolant 140 through the lid outer passage 125 may result from convective flow of the coolant 140. Alternatively or additionally, flow of the coolant 140 through the lid outer passage 125 and/or the vapor passage 123 may be induced by a pump that may induce flow of the coolant 140 in any suitable direction through lid cooling circuit 122. In some embodiments, the lid outer passage 125 and the lid exit passage 127 may include a wick or other porous surface that is configured to encourage coolant flow 140 through the lid outer passage 125 and the lid exit passage 127. As the coolant 140 flows through the lid outer passage 125 and exchanges heat with the ambient medium 10, the coolant 140 cools and flows downward to the vapor passage 123 through a lid return passage 129 that is positioned below the lid exit passage 127 and the vapor passage 123. Flowing through the lid return passage 129, the coolant 140 absorbs heat from the inner cavity 116 of the outer shell 110 and returns to the vapor passage 123. In some embodiments, the lid return passage 129 may include a wick or other porous surface that is configured to induce inward flow of the coolant 140 to the vapor passage 123. In this way, the lid cooling circuit 122 may assist in dissipating heat generated by spent nuclear fuel positioned within the inner cavity 116. Similar to the cooling circuit 130 of the outer shell (FIG. 4), the coolant 140 include a gas, a liquid, or a gas/liquid mix that absorbs heat from the inner cavity 116. For example, in some embodiments, the coolant 140 includes helium or the like.

As described above, the lid 120 is coupled to a first end 102 of the outer shell 110, and when the outer shell 110 is positioned in a vertical orientation, the lid 120 is positioned proximate to the exit passage 136 (FIG. 4) of the outer shell 110. As the coolant 140 (FIG. 4) absorbs heat, the temperature of the coolant 140 rises, and the coolant 140 within the exit passage 136 may have a higher temperature than coolant 140 at other positions within the cooling circuit 130 (FIG. 4). Put another way, the coolant 140 (FIG. 4) may be at its hottest point within the cooling circuit 130 at the exit passage 136 at the first end 102 of the outer shell 110. Accordingly, by including a lid 120 including a cooling circuit 122, heat from the coolant 140 within the cooling circuit 130 of the outer shell 110 (FIG. 4), as well as heat generated from the inner cavity 116 of the outer shell 110 may be dissipated.

Referring collectively to FIGS. 8 and 9, another embodiment of the fuel storage cask 100 is depicted. Similar to the embodiment depicted in FIG. 1 and described above, the fuel storage cask 100 includes the outer shell 110 having the first end 102 and the second end 104 positioned opposite the first end 102. The fuel storage cask 100 further includes the lid 120 coupled to the first end 102, and may include a second lid coupled to the second end 104 of the outer shell 110.

Referring to FIG. 10, a section view of the fuel storage cask 100 is depicted along section 8-8 of FIG. 7. Similar to the embodiment described above with respect to FIG. 3A, the outer shell 110 includes a cooling circuit 130 that is positioned between the outer perimeter 112 of the outer shell 110 and the inner perimeter 114. The outer shell 110 includes shielding 117 that restricts and/or prevents radiation from spent nuclear fuel rods within the inner cavity 116 from passing through the outer shell 110. The shielding 117 may include various materials that restrict and/or prevent radiation from passing through the shielding, such as lead, iron, concrete or the like. The shielding may be positioned to encapsulate the inner cavity 116, such that shielding is positioned between the inner cavity 116 and the outer perimeter 112 of the outer shell 110, so as to prevent a "direct path," or route for radiation emitted from within the inner cavity 116 to reach areas outside of the outer shell 110 without first passing through the shielding. In other words, shielding may be positioned throughout the outer shell 110 so as to fully encapsulate the inner cavity 116.

Referring collectively to FIGS. 11 and 12, a section view of the outer shell 110 is depicted along section 9-9 and 10-10 of FIG. 9 is schematically depicted, respectively. In the configuration depicted in FIGS. 11 and 12, the outer shell 110 is oriented in a horizontal direction, such that the first end 102 and the second end 104 (FIG. 9) are similarly positioned in the vertical direction, as opposed to the first end 102 being positioned above the second end 104 in the vertical direction. The cooling circuit 130 includes the inner passage 132 that extends circumferentially around the inner perimeter 114 and includes a generally annular shape. Similarly, the cooling circuit 130 includes the outer passage 134 that extends circumferentially around the inner passage 132 and includes a generally annular shape. Similar to the embodiment described above and depicted in FIGS. 3A-3C, the shielding 117 is positioned between the inner passage 132 and the outer passage 134 and is positioned so as to prevent a "direct path," or route for radiation emitted from within the inner cavity 116 to reach areas outside of the outer shell 110 without first passing through the shielding. Alternatively, the shielding 117 may be positioned outward of the outer passage 134 and/or inward of the inner passage 132 to prevent radiation emitted from within the inner cavity 116.

The coolant 140 is positioned in the inner passage 132 and the outer passage 134 and assists in dissipating heat generated by spent fuel rods positioned within the inner cavity 116 of the outer shell 110. In particular, the inner passage 132 of the cooling circuit 130 is thermally coupled to the inner cavity 116 such that heat generated by spent fuel rods within the inner cavity 116 may be transferred to the inner passage 132, and more particularly to the coolant 140 within the inner passage 132. In the embodiment shown in FIGS. 9 and 10, the coolant 140 flows upward and circumferentially around the inner passage 132, where it absorbs heat energy from the inner cavity 116. The upward flow of the coolant 140 may be induced by convective flow of the coolant 140 resulting from the absorbed heat energy from the inner cavity 116. Alternatively or additionally, the flow of the coolant 140 through the inner passage 132 may be induced, such as with a pump, and the pump may induce flow of the coolant 140 upward or downward in the vertical direction within the inner passage 132. Upon reaching the top of the inner passage 132, the coolant 140 flows upward through the exit passage 136 toward the outer passage 134, which is in fluid communication with the inner passage 132 through the exit passage 136. While only a portion of the exit passage 136 is shown in FIGS. 11 and 12, it should be understood that the exit passage 136 extends along the length 106 (FIG. 8) of the outer shell 110. By including an exit passage 136 that extends along the length 106 (FIG. 8) of the outer shell 110, the exit passage 136 allows upward flow of the coolant 140 to the outer passage 134 from the inner passage 132 when the outer shell 110 is in the horizontal orientation as shown in FIGS. 11 and 12, as compared to the embodiment shown in FIG. 3B, in which the outer shell 110 is in the vertical orientation.

Flowing upward through the exit passage 136, the coolant 140 then flows circumferentially around and downward through the outer passage 134, dissipating heat to the ambient medium 10 surrounding the outer shell 110. The ambient medium 10 may include gas, liquid, and/or a solid surrounding the outer shell, such as ambient air. The downward flow of the coolant 140 through the outer passage 134 may similarly be induced by convective flow of the coolant 140 as energy from the coolant 140 is transferred to the ambient medium 10. In particular, the coolant 140 within the outer passage 134 is positioned distal from the inner cavity 116 as compared to the coolant 140 within the inner passage 132, reducing the amount of heat absorbed by the coolant 140 within the outer passage 134 as compared to the inner passage 132. Further, the outer passage 134 is thermally coupled to the ambient medium 10 surrounding the outer shell 110, such that heat from the coolant 140 is transferred to the ambient medium 10. Alternatively or additionally, the flow of the coolant 140 through the outer passage 134 may be induced, such as with a pump, and the pump may induce flow of the coolant 140 upward or downward in the vertical direction within the outer passage 134.

As the coolant 140 cools and flows downward and circumferentially around the outer passage 134, the coolant reaches the bottom of the outer passage 134. The coolant 140 then flows upward through the return passage 138 that is in fluid communication with the inner passage 132 and the outer passage 134. While only a portion of the return passage 138 is shown, it should be understood that the return passage 138 extends along the length 106 (FIG. 8) of the outer shell 110. By including a return passage 138 that extends along the length 106 (FIG. 8) of the outer shell 110, the return passage 138 allows upward flow of the coolant 140 to the inner passage 132 from the outer passage 134 when the outer shell 110 is in the horizontal orientation as shown in FIGS. 11 and 12, as compared to the embodiment shown in FIG. 3B, in which the outer shell 110 is in the vertical orientation. In some embodiments, the fuel storage cask 100 may include an optional wick that is positioned within the return passage 138, the outer passage 134, and/or the inner passage 132 to assist in moving the coolant 140 upward through the return passage 138 toward the inner passage 132.

Referring to FIG. 13, a cross-section of the outer shell 110 is depicted showing the flow of the coolant 140 through the cooling circuit 130. As described above, when the outer shell 110 is in a horizontal orientation, the coolant 140 flows upward and circumferentially around the inner passageway 132 toward the exit passage 136, absorbing heat from the inner cavity 116, such as heat energy that may be generated from spent fuel rods positioned within the inner cavity 116. The coolant 140 then moves upward through the exit passage 136 toward the outer passage 134. After passing through the exit passage 136, the coolant 140 flows downward and circumferentially around the outer passage 134, and dissipates heat to the ambient medium 10. After cooling, the coolant 140 reaches the return passage 138 and flows upward back to the inner passage 132 to again absorb heat from the inner cavity 116. The fuel storage cask 100 optionally includes the wick 142 positioned in the outer passage 134, the return passage 138, and/or the inner passage 132, and the wick 142 may assist in moving coolant 140 through the return passage 138 to the inner passage 132. In embodiments, the coolant 140 may include a gas, a liquid, or a gas/liquid mix that absorbs heat from the inner cavity 116. For example, in some embodiments, the coolant 140 includes helium or the like.

Referring to FIG. 14, another embodiment of the fuel storage cask 100 is schematically depicted. The fuel storage cask 100 includes the outer shell 110 with a cooling circuit 130, similar to the above-described embodiments. In the embodiment depicted in FIG. 14, a central cooling member 160 extends through the center of the outer shell 110. The central cooling member 160 provides cooling to the center of the inner cavity 116 (FIG. 13).

Referring to FIG. 15, the outer shell 110 is shown in hidden lines for clarity. A basket 117 may optionally be positioned within the inner cavity 116, and may assist in aligning and storing spend fuel rods within the inner cavity 116. The central cooling member 160 extends through a center portion 113 of the inner cavity 116 and the central cooling member 160 may assist in dissipating heat from the center portion 113 of the inner cavity 116. As described above and as depicted in the embodiments shown in FIGS. 4 and 13, the cooling circuit 130 includes the inner passage 132 (FIG. 13) which is positioned around the inner perimeter 114, and acts to absorb heat from the inner cavity 116 around the inner perimeter 114. However, since the cooling circuits 130 depicted in FIGS. 4 and 13 extend around the inner perimeter 114 of the inner cavity 116, the cooling circuits 130 may have difficulty absorbing heat from the center portion 113 of the inner cavity 116, as the center portion 113 is positioned radially inward and distal from the inner perimeter 114. However, in the embodiment depicted in FIG. 15, the central cooling member 160 extends through the center portion 113 of the inner cavity 116 and absorbs heat from the center portion 113 of the inner cavity 116.

Referring to FIG. 16, the central cooling member 160 is depicted in isolation. The central cooling member 160 includes one or more evaporator passages 162 that are in fluid communication with one or more condenser passages 164, and the coolant 140 is positioned within the evaporator passages 162 and the condenser passages 164. The evaporator passages 162 are thermally coupled to the inner cavity 116 (FIG. 15) of the outer shell 110, such that heat energy, such as may be generated by spent fuel rods positioned within the inner cavity 116, is transmitted to the evaporator passages 162, and more particularly to the coolant 140 positioned within the evaporator passages 162. As the coolant 140 within the evaporator passages 162 absorbs heat energy from the inner cavity 116 (FIG. 15), the coolant 140 flows upward through the evaporator passages 162, and outward to the condenser passages 164. The condenser passages 164 are thermally coupled to the ambient medium 10 (FIG. 15), and heat energy from the coolant 140 within the condenser passages 164 is dissipated to the ambient medium 10. As the coolant 140 within the condenser passages 164 dissipates heat, the coolant 140 cools and flows downward through the condenser passages 164 in the vertical direction, until the coolant reaches the bottom of the condenser passages 164. Upon reaching the bottom of the condenser passages 164, the coolant 140 flows inward toward towards the evaporator passages 162, and again absorbs heat from the inner cavity 116 (FIG. 15). The coolant 140 may move through the evaporator passages 162 and the condenser passages 164 through convective flow of the coolant 140 resulting from the absorption and dissipation of heat energy of the coolant 140. Alternatively or additionally, the flow of the coolant 140 through the evaporator passages 162 and the condenser passages 164 may be induced, such as with a pump, and the pump may induce flow of the coolant 140 upward or downward in the vertical direction within the evaporator passages 162 and the condenser passages 164.

The central cooling member 160 may be used in conjunction with the cooling circuit 130 described above and depicted in FIGS. 4 and 11, which may assist in dissipating heat from both the inner perimeter 114 of the inner cavity 116 (FIG. 4), as well the center portion 113 of the inner cavity 116 (FIG. 15). In some embodiments, the evaporator passages 162 and/or the condenser passages 164 of the central cooling member 160 may be in fluid communication with the inner passage 132 and/or the outer passage 134 of the cooling circuit 130 described above and depicted in FIGS. 4 and 13. In other words, the coolant 140 within the central cooling member 160 may be in fluid communication with the coolant 140 within the cooling circuit 130 described above and depicted in FIGS. 4 and 13, such that the central cooling member 160 is integral with the cooling circuit 130. Alternatively, the central cooling member 160 may be separate and/or separable from the cooling circuit 130 (FIGS. 4, 13). In such embodiments, the central cooling member 160 may be in fluid communication with the cooling circuit 130, or may not be in fluid communication with the cooling circuit 130, and may be hermetically sealed, operating independently of the cooling circuit 130 described above and depicted in FIGS. 4 and 13. In some embodiments, the central cooling member 160 operate as a standalone cooling member 160, for example, in fuel storage casks that do not include a cooling circuit 130.

Accordingly, it should now be understood that fuel storage casks according to the present disclosure include a cooling circuit that dissipates heat from an inner cavity of an outer shell of a fuel storage cask. The cooling circuit may be hermetically sealed and extend around an inner perimeter of the inner cavity of the fuel storage cask. Coolant within the cooling circuit flows through an inner passage that is thermally coupled the inner cavity of the fuel storage cask, and may absorb heat energy from spent fuel rods positioned within the inner cavity. The inner passage may include an annular shape that extends circumferentially around the inner cavity of the fuel storage cask to maximize the surface area of coolant exposed to the heat generated from within the inner cavity, which may assist in maximizing the amount of heat that may be absorbed by the coolant. The coolant flows from the inner passage to an outer passage of the cooling circuit, and the outer passage is thermally coupled to an ambient medium. The outer passage may include an annular shape that extends circumferentially around the outer shell of the fuel storage cask, which may maximize the surface area of coolant exposed to the ambient medium, which may assist in maximizing the amount of heat that may be dissipated to the ambient medium from the coolant. In this way, the cooling circuit forms a "closed loop" circuit for cooling the fuel storage cask that is not exclusively dependent on external airflow over the fuel storage cask to draw heat away from the fuel storage cask. By reducing the dependency on external airflow to cool the fuel storage cask, the cooling circuit may maintain the fuel storage cask at an operable temperature without requiring external vents to direct airflow, which may reduce maintenance and operating costs associated with the fuel storage cask and reduce risk of the fuel storage cask overheating in the instance of an external vent being blocked.

That which is claimed:

1. A cooling system for a nuclear fuel storage cask, the cooling system comprising:

an inner passage extending around and circumscribing an inner perimeter of a nuclear fuel storage cask and extending along a length of the nuclear fuel storage cask, the length being evaluated between a first end and a second end of the nuclear fuel storage cask positioned opposite the first end;

an outer passage positioned outward from the inner passage and in fluid communication with the inner passage;

a coolant positioned within the inner passage and the outer passage, wherein the coolant is configured to move through the inner passage, absorbing heat from an inner cavity of the storage cask, and the coolant is configured to move through the outer passage, dissipating heat through an outer perimeter of the storage cask, wherein the inner cavity is circumscribed by an outer shell; and a lid to the outer shell, wherein the lid covers the inner cavity of the outer shell and the lid comprises a lid cooling circuit, the lid cooling circuit comprising a vapor passage and a lid outer passage distinct from one another, the lid outer passage positioned outward of the vapor passage, wherein the lid further comprises a lid coolant positioned within the lid cooling circuit, and wherein the lid coolant remains in the lid cooling circuit and circulates between the vapor passage and the lid outer passage.

2. The cooling system of claim 1, wherein the inner passage is an annular inner passage extending circumferentially around the inner perimeter of the nuclear fuel storage cask.

3. The cooling system of claim 1, wherein the outer passage is an annular outer passage extending circumferentially around the inner passage.

4. The cooling system of claim 1, further comprising an exit passage in fluid communication with the inner passage and the outer passage, wherein the exit passage is positioned at the first end of the nuclear fuel storage cask and extends circumferentially around the nuclear fuel storage cask.

5. The cooling system of claim 1, further comprising an exit passage in fluid communication with the inner passage and the outer passage, wherein the exit passage extends radially along the length of the nuclear fuel storage cask.

6. The cooling system of claim 1, further comprising a return passage in fluid communication with the inner passage and the outer passage, wherein the return passage is positioned at the second end of the nuclear fuel storage cask and extends circumferentially around the nuclear fuel storage cask.

7. The cooling system of claim 1, further comprising a return passage in fluid communication with the inner passage and the outer passage, wherein the return passage extends radially along the length of the nuclear fuel storage cask.

8. The cooling system of claim 1, further comprising a central cooling member extending through a center of the nuclear fuel storage cask.

* * * * *

UNITED STATES PATENT AND TRADEMARK OFFICE
CERTIFICATE OF CORRECTION

PATENT NO. : 11,557,405 B2
APPLICATION NO. : 16/946905
DATED : January 17, 2023
INVENTOR(S) : Bright Page 1 of 1

It is certified that error appears in the above-identified patent and that said Letters Patent is hereby corrected as shown below:

In the Claims

Column 14
Line 1, Claim 1 "a lid to the outer shell" should read --a lid coupled to the outer shell--

Signed and Sealed this
Eleventh Day of April, 2023

Katherine Kelly Vidal
*Director of the United States Patent and Trademark Office*